(12) United States Patent
Saeki (10) Patent No.: US 10,041,397 B2
(45) Date of Patent: Aug. 7, 2018

(54) ELECTRIC WASTE GATE VALVE SYSTEM AND METHOD FOR CONTROLLING ELECTRIC WASTE GATE VALVE SYSTEM

(71) Applicant: TOYOTA JIDOSHA KABUSHIKI KAISHA, Toyota-shi, Aichi-ken (JP)

(72) Inventor: Masanori Saeki, Toyota (JP)

(73) Assignee: TOYOTA JIDOSHA KABUSHIKI KAISHA, Tokyo (JP)

(*) Notice: Subject to any disclaimer, the term of this patent is extended or adjusted under 35 U.S.C. 154(b) by 95 days.

(21) Appl. No.: 15/104,038

(22) PCT Filed: Dec. 3, 2014

(86) PCT No.: PCT/IB2014/002628
§ 371 (c)(1),
(2) Date: Jun. 13, 2016

(87) PCT Pub. No.: WO2015/097505
PCT Pub. Date: Jul. 2, 2015

(65) Prior Publication Data
US 2017/0002728 A1 Jan. 5, 2017

(30) Foreign Application Priority Data
Dec. 26, 2013 (JP) ................................ 2013-269565

(51) Int. Cl.
*F02D 23/00* (2006.01)
*F02B 37/18* (2006.01)
(Continued)

(52) U.S. Cl.
CPC ............ *F02B 37/183* (2013.01); *F02B 37/18* (2013.01); *F02D 41/0007* (2013.01);
(Continued)

(58) Field of Classification Search
CPC ...... F02B 37/18; F02B 37/183; F02B 37/186; F02D 41/0007; F02D 41/20; F02D 2041/2058; Y02T 10/144
(Continued)

(56) References Cited

U.S. PATENT DOCUMENTS 5,163,294 A 11/1992 Shirai
5,850,738 A * 12/1998 Hayashi .................. F02B 37/18
60/602

(Continued)

FOREIGN PATENT DOCUMENTS

JP S62-176442 U 11/1987
JP H05-32732 U 4/1993
(Continued)

OTHER PUBLICATIONS

Jul. 5, 2016 Office Action issued in Japanese Patent Application No. 2013-269565.

*Primary Examiner* — Thai Ba Trieu
(74) *Attorney, Agent, or Firm* — Oliff PLC (57) ABSTRACT

An electric waste gate valve system includes a waste gate valve, an electric actuator that drives waste gate valve, an impeller rotation speed sensor, and an electronic control unit. The waste gate valve opens and closes a bypass passage that bypasses a turbine impeller of a turbocharger. The electronic control unit is configured to calculate a predicted value of the rotation speed of the impeller when the waste gate valve is closed. The electronic control unit is configured to drive the electric actuator in a valve-closing direction to close the waste gate valve. The electronic control unit is configured to stop the driving of the waste gate valve by the electric actuator when the rotation speed of the impeller detected by the impeller rotation speed sensor increases to a reference value determined based on the predicted value.

5 Claims, 4 Drawing Sheets

(51) Int. Cl.
*F02D 41/00* (2006.01)
*F02D 41/20* (2006.01)

(52) U.S. Cl.
CPC ...... *F02D 41/20* (2013.01); *F02D 2041/2058* (2013.01); *Y02T 10/144* (2013.01)

(58) Field of Classification Search
USPC .......................................................... 60/602
See application file for complete search history.

(56) References Cited

U.S. PATENT DOCUMENTS

| | | | | |
|---|---|---|---|---|
| 5,899,069 | A * | 5/1999 | Watanabe | F02B 37/18 60/602 |
| 5,960,631 | A * | 10/1999 | Hayashi | F02B 37/18 60/602 |
| 6,076,352 | A * | 6/2000 | Hayashi | F02B 37/18 60/602 |
| 8,915,708 | B2 * | 12/2014 | Yang | F04D 29/104 415/111 |
| 2014/0034026 | A1 * | 2/2014 | Katsumata | F02D 41/0007 123/559.1 |
| 2016/0076438 | A1 * | 3/2016 | Tabata | F02B 37/186 60/602 |
| 2017/0051662 | A1 * | 2/2017 | Hagari | F02B 37/18 |
| 2017/0145905 | A1 * | 5/2017 | Yamane | F02D 41/0007 |
| 2017/0145906 | A1 * | 5/2017 | Tomita | F02D 41/0007 |
| 2017/0184013 | A1 * | 6/2017 | Ono | F02B 37/186 |
| 2017/0306834 | A1 * | 10/2017 | Takahashi | F02B 37/18 |

FOREIGN PATENT DOCUMENTS

| | | |
|---|---|---|
| JP | 2008-223527 A | 9/2008 |
| JP | 2012-067698 A | 4/2012 |
| JP | 2013-024205 A | 2/2013 |
| JP | 2013-170469 A | 9/2013 |
| JP | 2013-241896 A | 12/2013 |

* cited by examiner

ELECTRIC WASTE GATE VALVE SYSTEM AND METHOD FOR CONTROLLING ELECTRIC WASTE GATE VALVE SYSTEM

CROSS-REFERENCE TO RELATED APPLICATIONS

This application is a National Stage under 35 U.S.C. § 371 of International Application No. PCT/IB2014/002628, filed on Dec. 3, 2014, which claims priority of Japanese patent application number 2013-269565, filed on Dec. 26, 2013.

BACKGROUND OF THE INVENTION

1. Field of the Invention

The present invention relates to an electric waste gate valve system that opens and closes a waste gate valve of a turbocharger by using an electric actuator.

2. Description of Related Art

Japanese Patent Application Publication No. 2012-067698 (JP 2012-067698 A) discloses an electric waste gate valve system that opens and closes a waste gate valve by using an electric motor. In the electric waste gate valve system, the electric motor rotates a worm gear, and a link mechanism that is connected to the waste gate valve is driven via a worm wheel that is engaged with the worm gear.

In the electric waste gate valve system disclosed in JP 2012-067698 A, the valve is determined to be completely closed and the electric motor is stopped when a rotation angle of the worm wheel reaches a target gear angle corresponding to a closed position during the closing of the waste gate valve.

A deposit may be deposited in a valve element of the waste gate valve and a valve seat portion on which the valve element is seated, or the valve element and the valve seat portion may be deformed due to a time-dependent deterioration. In this case, a target operation position that is previously set as a target value for closing of the waste gate valve may differ from an operation position of the actuator at a time when the closing of the waste gate valve is actually completed.

The electric waste gate valve system disclosed in JP 2012-067698 A continues driving the actuator to the target operation position. Accordingly, the driving of the actuator continues even after the valve element abuts against the valve seat portion and the closing of the waste gate valve is completed if the valve element abuts against the valve seat portion before reaching the target operation position due to the deposition of the deposit and the like. As a result, a load that acts on the valve seat portion becomes excessively large, and the valve seat portion may sink due to the valve-closing operation as the case may be.

SUMMARY OF THE INVENTION

The present invention provides an electric waste gate valve system that is capable of suppressing an excessively large load acting on a valve seat portion during a valve-closing operation.

According to a first aspect of the invention, an electric waste gate valve system includes a waste gate, valve, an electric actuator, an impeller rotation speed sensor, and an electronic control unit. The waste gate valve is configured to open and close a bypass passage that bypasses a turbine impeller of a turbocharger. The electric actuator is configured to drive the waste gate valve. The impeller rotation speed sensor is configured to measure a rotation speed of an impeller of the turbocharger. The electronic control unit is configured to calculate a predicted value of the rotation speed of the impeller when the waste gate valve is closed. The electronic control unit is configured to drive the electric actuator in a valve-closing direction to close the waste gate valve. The electronic control unit is configured to stop the driving of the waste gate valve by the electric actuator when the rotation speed of the impeller detected by the impeller rotation speed sensor increases to a reference value determined based on the predicted value.

When the waste gate valve is open, an exhaust flows into the bypass passage according to an opening of the waste gate valve, bypasses the turbine impeller, and flows to a downstream side. When the waste gate valve is closed, the exhaust that flows from an upstream side is blown to the turbine impeller. Accordingly, when the waste gate valve is closed, the rotation speed of the impeller is higher than when the waste gate valve is open.

In the configuration described above, the rotation speed of the impeller that is detected by the impeller rotation speed sensor is compared to the reference value that is determined based on the predicted value of the rotation speed of the impeller when the waste gate valve is closed when the waste gate valve is closed. The driving of the waste gate valve by the actuator is stopped when the detected rotation speed of the impeller becomes equal to or higher than the reference value. In other words, the driving of the actuator is stopped based on the actual rotation speed of the impeller reaching the reference value that is determined based on the predicted value of the rotation speed of the impeller at a time when the waste gate valve is completely closed according to the configuration described above. Accordingly, the waste gate valve can be determined to be completely closed and the driving of the actuator can be stopped, even if an operation position of the actuator is not an operation position that is set as a closed position of the valve element, when the detected rotation speed of the impeller is equal to or higher than the reference value.

According to this configuration, it can be determined whether or not the waste gate valve is completely closed based on the actual rotation speed of the impeller. Accordingly, timing at which the actuator is stopped can be optimized. In addition, an excessively large load acting on the valve seat portion during the valve-closing operation can be suppressed. Eventually, sinking of the valve seat portion can be suppressed.

If an intake air amount for an internal combustion engine, a fuel injection amount, and an opening of a throttle valve can be apprehended, a flow rate of the exhaust that is discharged from a combustion chamber of the internal combustion engine can be estimated. The opening of the waste gate valve can be estimated if the operation position of the actuator can be apprehended. The flow rate of the exhaust that is blown to the turbine impeller can be estimated if the flow rate of the exhaust and the opening of the waste gate valve can be estimated. Accordingly, the rotation speed of the impeller can be predicted.

In the electric waste gate valve system described above, the electronic control unit may be configured to calculate the predicted value based on the intake air amount, the fuel injection amount, the opening of the throttle valve, and the operation position of the electric actuator.

In the electric waste gate valve system described above, the electronic control unit may be configured to detect a current value of a driving current of the electric actuator when the waste gate valve is closed and the electronic control unit may be configured to decrease an operation speed of the waste gate valve driven by the electric actuator when the current value exceeds a reference current value, the operation speed of the waste gate valve when the current value exceeds a reference current value being lower than the operation speed of the waste gate valve when the current value is equal to or lower than the reference current value, the reference current value corresponding to the current value when a valve element of the waste gate valve abuts against the valve seat portion of the waste gate valve.

When the valve element abuts against the valve seat portion as a result of the valve-closing operation for the waste gate valve, a load of the electric actuator increases, and thus the current value of the driving current of the electric actuator significantly rises. According to the configuration described above, it can be determined that the valve element abuts against the valve seat portion based on the current value of the driving current of the electric actuator exceeding the reference current value showing that the valve element of the waste gate valve abuts against the valve seat portion of the waste gate valve. According to the configuration described above, the operation speed of the waste gate valve after the abutting of the valve element against the valve seat portion becomes lower than the operation speed prior to the abutting. In this manner, the valve element is driven little by little in the valve-closing direction until the waste gate valve is completely closed, and an excessively large load acting on the valve seat portion can be suppressed. Accordingly, sinking of the valve seat portion can be further suppressed. According to, the configuration described above, the waste gate valve can be quickly driven until the valve element is seated on the valve seat portion. Accordingly, the length of time taken to close the waste gate valve can be shortened.

In the electric waste gate valve system described above, the electronic control unit may be configured to learn the operation position of the electric actuator when the driving of the electric actuator is stopped as the closed position of the waste gate valve and the electronic control unit may be configured to decrease the operation speed of the waste gate valve driven by the electric actuator when the waste gate valve reaches the closed position, the operation speed when the waste gate valve reaches the closed position is lower than the operation speed when the waste gate valve does not reach the closed position.

According to the configuration described above, the electric actuator can be controlled based on the learned closed position when the waste gate valve is closed. According to the configuration described above, the operation speed of the waste gate valve after reaching the closed position is lower than the operation speed before reaching the closed position. Accordingly, the valve element is driven little by little in the valve-closing direction until the waste gate valve is completely closed. As a result, an excessively large load acting on the valve seat portion can be suppressed. Accordingly, sinking of the valve seat portion can be further suppressed. In other words, the driving speed of the waste gate valve is decreased when the operation position of the electric actuator approaches the learned closed position, and thus control for decreasing the driving speed of the waste gate valve before the valve element of the waste gate valve abuts against the valve seat portion can be performed. Since the waste gate valve can be quickly driven until the valve element is seated on the valve seat portion, the length of time taken to close the waste gate valve can be shortened.

Accordingly, driving control for the waste gate valve can be optimized in view of the operation position at the preceding closing in performing the valve-closing operation.

In the electric waste gate valve system described above, the impeller rotation speed sensor may be disposed in a compressor housing of the turbocharger. The impeller rotation speed sensor may be configured to measure a rotation speed of a compressor impeller.

The impeller of the turbocharger includes the turbine impeller and the compressor impeller, and these impellers are connected to each other by a shaft and rotate with each other. Accordingly, a rotation speed of any one of the impellers may be detected, but the turbine impeller and a turbine housing are exposed to the high-temperature exhaust and are likely to be high in temperature.

According to the configuration described above, the impeller rotation speed sensor is disposed in not the turbine housing, which is likely to be high in temperature as described above, but in the compressor housing. Accordingly, the rotation speed of the impeller can be measured with a thermal effect being reduced.

According to a second aspect of the invention, a method for controlling an electric waste gate valve system including a waste gate valve, an electric actuator, an impeller rotation speed sensor and an electronic control unit. The waste gate valve is configured to open and close a bypass passage that bypasses a turbine impeller of a turbocharger. The electric actuator is configured to drive the waste gate valve. The impeller rotation speed sensor is configured to measure a rotation speed of an impeller of the turbocharger. The method includes: calculating a predicted value of the rotation speed of the impeller at a time when the waste gate valve is closed; driving the electric actuator in a valve-closing direction to close the waste gate valve; and stopping the driving of the waste gate valve by the electric actuator when the rotation speed of the impeller detected by the impeller rotation speed sensor increases to a reference value determined based on the predicted value.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
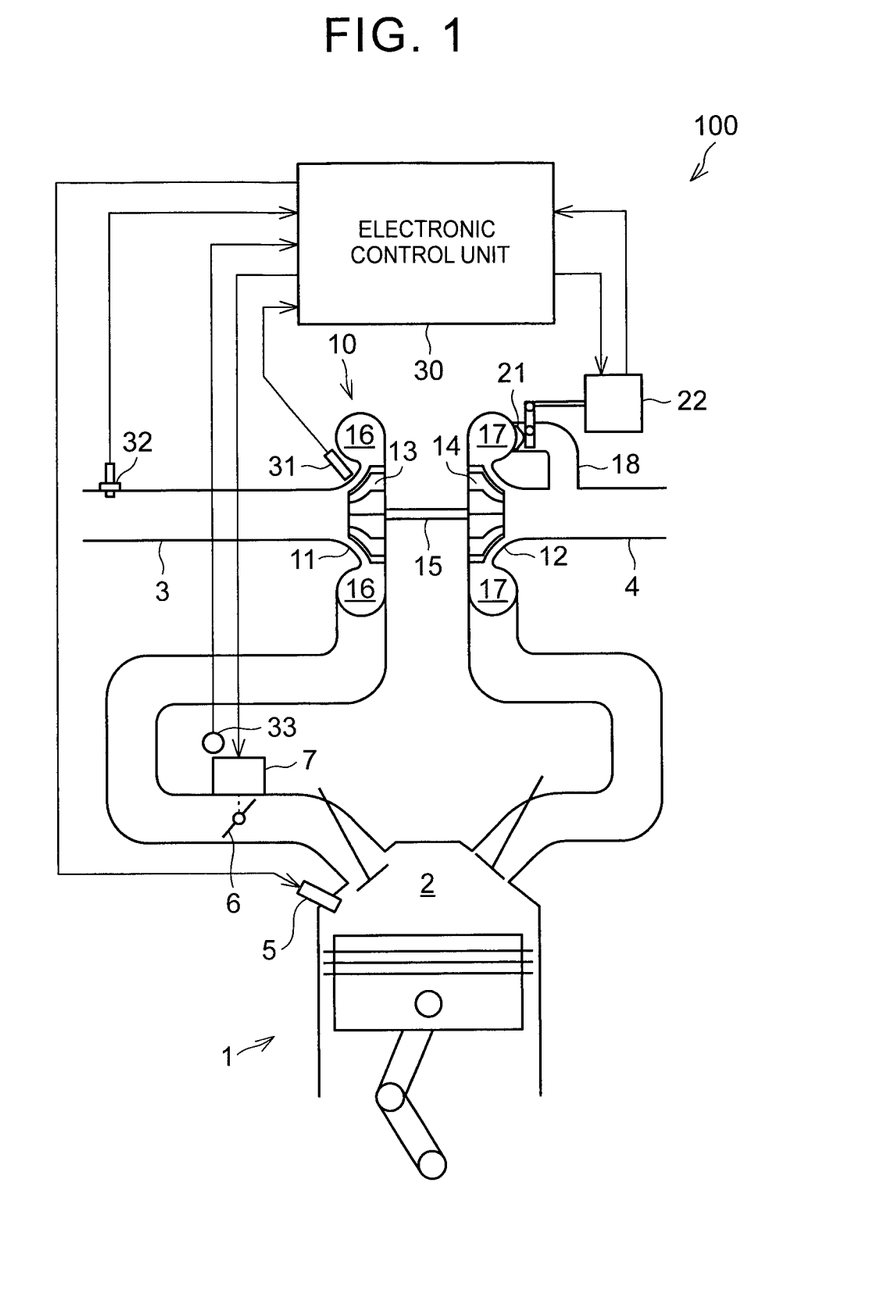
FIG. 1 is a schematic overall view illustrating a configuration of an embodiment of an electric waste gate valve system.

Hereinafter, an embodiment of an electric waste gate valve system will be described with reference to FIGS. 1 to 4. As illustrated in FIG. 1, an internal combustion engine 1 is provided with an exhaust driving-type turbocharger 10. The turbocharger 10 is provided with a compressor housing 11 and a turbine housing 12. The compressor housing 11 is disposed in the middle of an intake passage 3 of the internal combustion engine 1. The turbine housing 12 is disposed in the middle of an exhaust passage 4 of the internal combustion engine 1. A compressor impeller 13 is accommodated in the compressor housing 11. A compressor scroll 16 that extends to surround an outer circumference of the compressor impeller 13 is formed in the compressor housing 11. A turbine impeller 14 is accommodated in the turbine housing 12. A turbine scroll 17 that extends to surround an outer circumference of the turbine impeller 14 is formed in the turbine housing 12. The compressor impeller 13 and the turbine impeller 14 are connected to each other via a shaft 15. In the turbocharger 10, the turbine impeller 14 rotates when an exhaust that is discharged from a combustion chamber 2 of the internal combustion engine 1 is blown to the turbine impeller 14 through the turbine scroll 17. The compressor impeller 13 rotates with the turbine impeller 14, and thus an intake air that flows through the intake passage 3 is pressurized through the compressor scroll 16 and is forced to be fed into the combustion chamber 2. In other words, supercharging of the intake air is performed.

As illustrated in FIG. 1, a bypass passage 18 that branches from the turbine scroll 17 and bypasses the turbine impeller 14 is disposed in the exhaust passage 4. A waste gate valve 21 that opens and closes the bypass passage 18 is disposed in the bypass passage 18. The waste gate valve 21 is, as described later, driven by an electric actuator 22.

The electric actuator 22 is connected to an electronic control unit 30, and an operation amount of the electric actuator 22 is controlled by the electronic control unit 30. A CPU, a ROM, a RAM, an input port, an output port, and the like constitute the electronic control unit 30. The CPU executes various types of computation processing associated with engine control. A program and data required for the control are stored in the ROM. The RAM temporarily stores a result of computation by the CPU and the like. An external signal is input into the input port. The output port outputs a signal outwards.

A detection circuit that detects the operation amount of the electric actuator 22 is connected to the electronic control unit 30. An opening AWG of the waste gate valve 21 is detected based on a detection signal for the operation amount of the electric actuator 22. Various sensors such as an impeller rotation speed sensor 31, an air flow meter 32, and a throttle sensor 33 are connected to the electronic control unit 30. The impeller rotation speed sensor 31 detects a rotation speed NT of the compressor impeller 13. The air flow meter 32 detects an intake air amount GA. The throttle sensor 33 detects an opening AT of a throttle valve 6. In addition, a driving circuit for a fuel injection valve 5 is connected to the electronic control unit 30, and a fuel injection amount GF is computed when driving of the fuel injection valve 5 is commanded. Driving circuits for various devices such as the electric actuator 22 and a throttle motor 7 are connected to the electronic control unit 30.

The electronic control unit 30 controls the electric actuator 22 according to detection signals of the various sensors and an engine operation state that is apprehended by computation results when driving signals are output to the various devices. In other words, the electronic control unit 30 functions as a control device that controls the electric actuator 22. The waste gate valve 21, the electric actuator 22, the impeller rotation speed sensor 31, and the electronic control unit 30 constitute an electric waste gate valve system 100.

Figure 2:
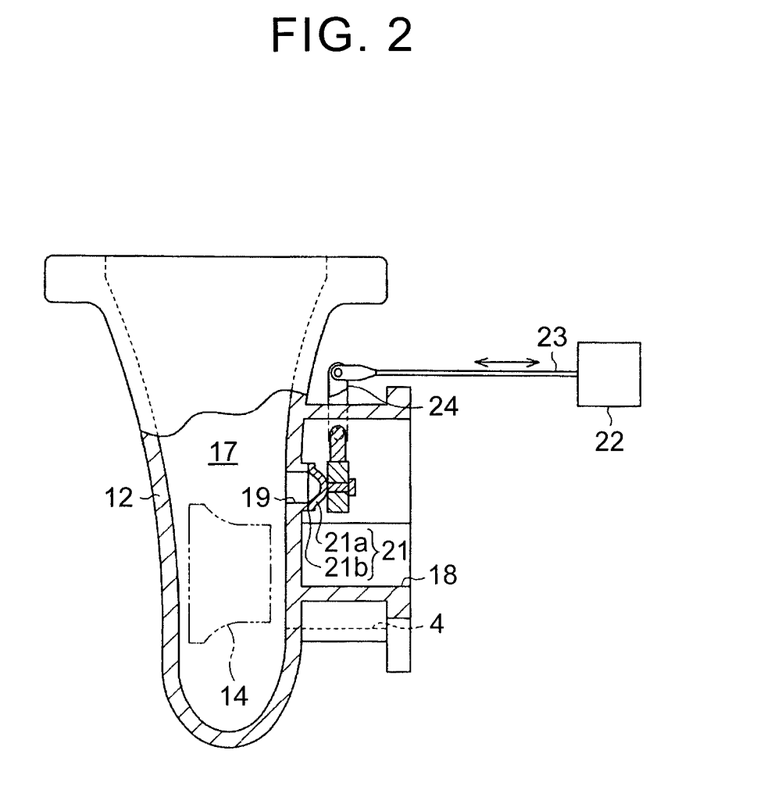
FIG. 2 is a cross-sectional view illustrating a cross-sectional structure of the vicinity of a waste gate valve of the embodiment.

A configuration of the waste gate valve 21 will be described in further detail with reference to FIG. 2. As illustrated in FIG. 2, a communication hole 19 that allows communication with the bypass passage 18 is formed in a wall surface of the turbine scroll 17 which is on an upstream side from the turbine impeller 14. A valve element 21a and a valve seat portion 21b constitute the waste gate valve 21. The valve seat portion 21b is a bypass passage 18 side open end of the communication hole 19 where the valve element 21a is seated. The valve element 21a is connected to a driving rod 23 of the electric actuator 22 via a link mechanism 24. The link mechanism 24 is connected to the driving rod 23, in a relatively pivotable manner, by using a connection pin as a fulcrum. Accordingly, the valve element 21a pivots and the opening of the waste gate valve 21 changes as a result of forward and backward movements of the driving rod 23 by the electric actuator 22 as illustrated by the arrow in FIG. 2.

The communication hole 19 is closed when the valve element 21a is in close contact with the valve seat portion 21b. When the communication hole 19 is closed, a passage for the exhaust that flows through the turbine scroll 17 to bypass the turbine impeller 14 and flow into the bypass passage 18 is blocked. When the valve element 21a is separated from the valve seat portion 21b, the communication hole 19 is opened. When the communication hole 19 is opened, a part of the exhaust that flows through the turbine scroll 17 flows into the bypass passage 18 and bypasses the turbine impeller 14.

A deposit may be deposited in the valve element 21a and the valve seat portion 21b of the waste gate valve 21 or the valve element 21a and the valve seat portion 21b may be deformed due to a time-dependent deterioration. In this case, a target operation position that is previously set as a target value for closing of the waste gate valve 21 may differ from an operation position of the electric actuator 22 when the closing of the waste gate valve 21 is actually completed.

It is conceivable that control be performed so that driving of the electric actuator 22 continues to the target operation position when the waste gate valve 21 is closed. However, in the case of this control, the driving of the electric actuator 22 continues even after the valve element 21a abuts against the valve seat portion 21b and the closing of the waste gate valve 21 is completed if the valve element 21a abuts against the valve seat portion 21b before reaching the target operation position due to the deposition of the deposit and the like. As a result, a load that acts on the valve seat portion 21b becomes excessively large, and the valve seat portion 21b may sink due to the valve-closing operation as the case may be.

In the electric waste gate valve system 100 according to this embodiment, processing at waste gate valve closing is executed so that the rotation speed NT of the compressor impeller 13, which is detected by the impeller rotation speed sensor 31, is checked and the driving of the electric actuator 22 is stopped when the waste gate valve 21 is closed.

Figure 3:
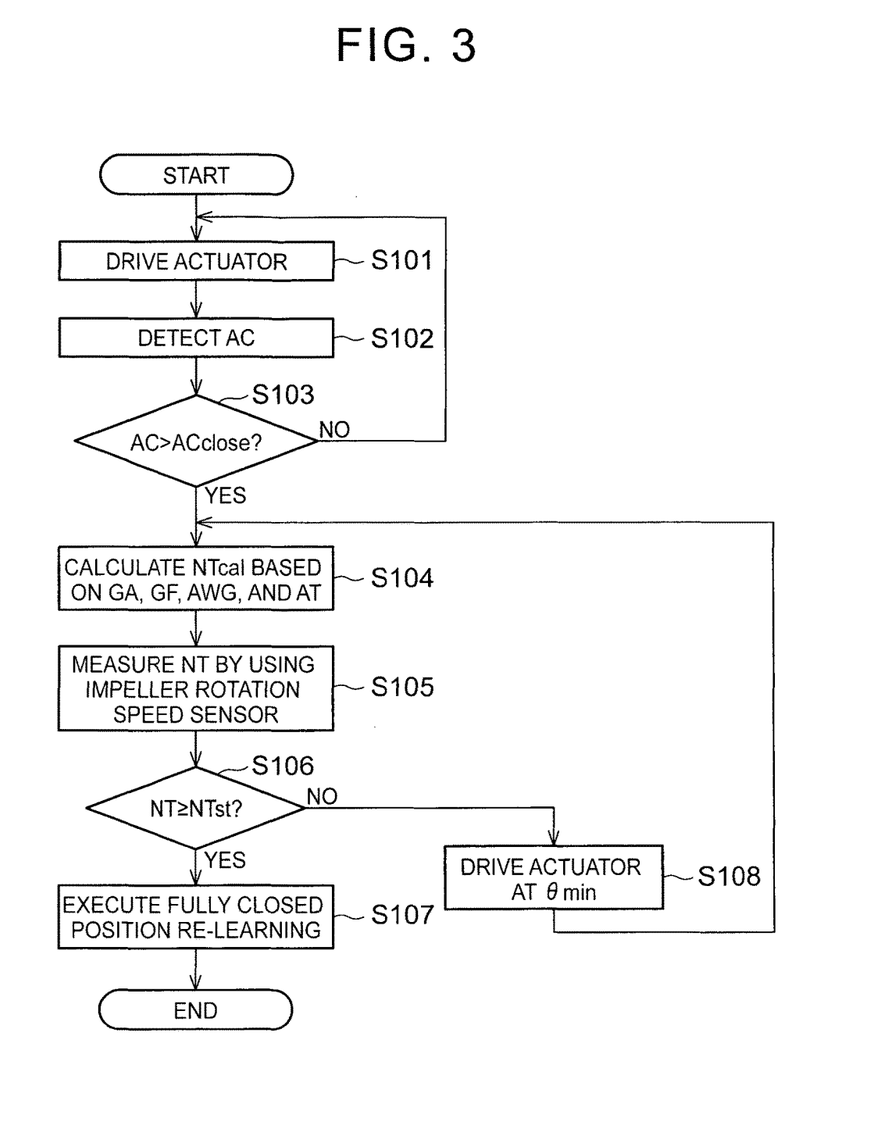
FIG. 3 is a flowchart illustrating a routine of processing at waste gate valve closing according to the electric waste gate valve system of this embodiment.

FIG. 3 is a flowchart illustrating a routine of the processing at waste gate valve closing. Hereinafter, this processing routine will be described. This processing routine is executed by the electronic control unit 30 when the waste gate valve 21 is closed.

When this processing routine is initiated, the electronic control unit 30 drives the electric actuator 22 to close the waste gate valve 21 (Step S101). If a closed position is learned through closed position learning processing of Step S107 (described later) in this case, a driving amount of the electric actuator is subjected to feedback control toward the learned closed position. Specifically, the control is performed so that the electric actuator 22 is quickly operated before the electric actuator 22 approaches the learned closed position and a driving speed of the electric actuator 22 is decreased when the electric actuator 22 approaches the learned closed position.

When the electric actuator 22 is driven in Step S101, the electronic control unit 30 detects a current value AC of a driving current of the electric actuator (Step S102). Then, the electronic control unit 30 determines whether or not the current value AC that is detected in Step S102 exceeds a reference current value AC close (Step S103).

When a force that acts on the valve element 21a changes as a result of the valve-closing operation for the waste gate valve 21, a load of the electric actuator 22 changes. Since the electric actuator 22 according to this embodiment is an electric actuator, the current value AC of the driving current of the electric actuator 22 rises as the load of the electric actuator 22 increases. In Step S103, it is determined whether or not the valve element 21a abuts against the valve seat portion 21b based on whether or not the current value AC exceeds the reference current value AC close.

Figure 4:
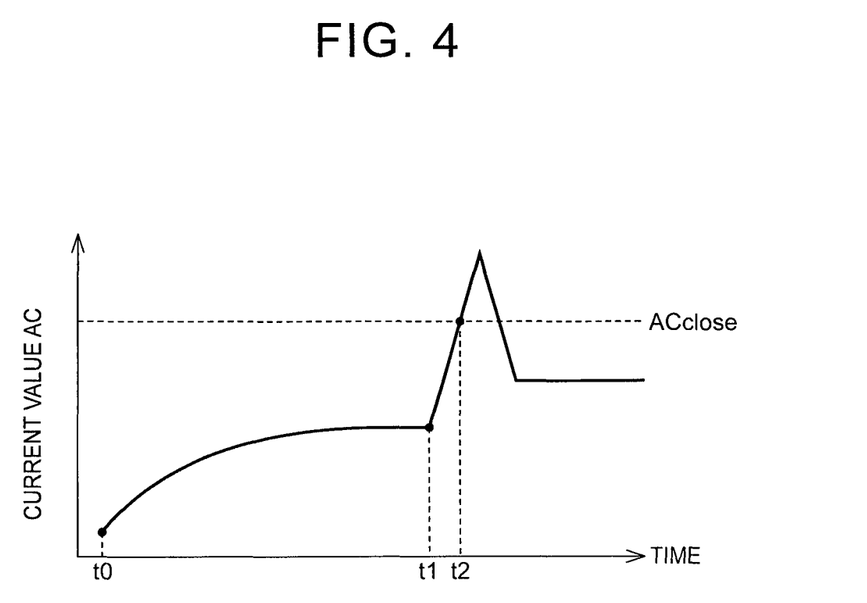
FIG. 4 is a time chart illustrating a change of a current value of a driving current of an electric actuator that occurs in a case where a constant voltage is applied so that the electric actuator is driven in a valve-closing direction.

The change of the current value AC at the closing of the waste gate valve 21 will be described with reference to FIG. 4. FIG. 4 is a time chart illustrating the change of the current value AC that occurs when a constant voltage is applied to the electric actuator 22 according to this embodiment so that the electric actuator 22 is driven in a valve-closing direction.

When the driving of the electric actuator 22 in the valve-closing direction is initiated at timing t0, the valve element 21a approaches the valve seat portion 21b. The opening of the waste gate valve 21 decreases, and a flow rate of the exhaust that passes through the waste gate valve 21 increases. As a result, the load of the electric actuator 22 increases. Accordingly, the current value AC gradually rises as illustrated in FIG. 4.

When the valve element 21a abuts against the valve seat portion 21b at timing t1, the valve element 21a receives a reaction force from the valve seat portion 21b, and thus the load of the electric actuator 22 rapidly increases. In this case, the current value AC significantly rises, too.

In the electronic control unit 30 according to this embodiment, a value of the current value AC showing that the valve element 21a abuts against the valve seat portion 21b is set as the reference current value AC close in view of the change of the current value AC at the closing of the waste gate valve 21. After the valve element 21a abuts against the valve seat portion 21b at timing t1, the current value AC reaches the reference current value AC close at timing t2 as illustrated in FIG. 4. As described above, the reference current value AC close is set to a value that is not exceeded unless the valve element 21a is seated on the valve seat portion 21b. The reference current value AC close may be any value at which the abutting of the valve element 21a against the valve seat portion 21b can be determined based on the current value AC exceeding the reference current value AC close. Accordingly, the reference current value AC close may be appropriately changed and set according to specifications of the electric actuator 22.

In a case where it is determined that the current value AC is equal to or less than the reference current value AC close in Step S103 (Step S103: NO), the process proceeds to Step S101 and the processing of Step S101 to Step S103 is repeated. In other words, the processing of Step S101 to Step S103 is repeated until the current value AC exceeds the reference current value AC close.

In a case where it is determined that the current value AC exceeds the reference current value AC close in Step S103 (Step S103: YES), the process proceeds to the subsequent step (Step S104).

In Step S104, the electronic control unit 30 calculates a predicted value NTcal of the rotation speed of the compressor impeller 13 based on the intake air amount GA, the fuel injection amount GF, the opening AWG of the waste gate valve 21, and the opening AT of the throttle valve 6.

The flow rate of the exhaust that is discharged from the combustion chamber 2 of the internal combustion engine can be estimated since the intake air amount GA, the fuel injection amount GF, and the opening AT of the throttle valve 6 are apprehended. The opening AWG of the waste gate valve 21 can be estimated since the operation position of the electric actuator 22 is apprehended. The flow rate of the exhaust that is blown to the turbine impeller 14 can be estimated by estimating the flow rate of the exhaust and the opening AWG. Accordingly, the rotation speed NT of the compressor impeller 13 can be predicted.

If the opening AWG is "0", the predicted value NTcal of the rotation speed NT of the compressor impeller 13 in a case where the valve element 21a is in close contact with the valve seat portion 21b and the communication hole 19 is closed can be predicted.

The predicted value NTcal of the rotation speed NT of the compressor impeller 13 at a time when the waste gate valve 21 is closed is calculated through Step S104 in this manner. Then, the electronic control unit 30 detects the rotation speed NT of the compressor impeller 13 that is measured by the impeller rotation speed sensor 31 (Step S105). The electronic control unit 30 sets the predicted value NTcal of the rotation speed NT of the compressor impeller 13 calculated in Step S104 as a reference value NTst. Herein, the reference value NTst is set to a value that is equal to the predicted value NTcal based on the predicted value NTcal. The reference value NTst that is set in this manner is compared to the rotation speed NT of the compressor impeller 13 that is detected in Step S105, and it is determined whether or not the rotation speed NT of the compressor impeller 13 is equal to or higher than the reference value NTst that is equal to the predicted value NTcal (Step S106).

When the waste gate valve 21 is open, the exhaust flows into the bypass passage 18 according to the opening AWG of the waste gate valve 21, bypasses the turbine impeller 14, and flows to a downstream side. When the valve element 21a is closed, the exhaust that flows from an upstream side is blown to the turbine impeller 14. Accordingly, the rotation speed NT of the compressor impeller 13 is higher when the valve element 21a is completely closed than when the valve element 21a is open. Accordingly, it is conceivable that the measured rotation speed NT of the compressor impeller 13 be equal to the predicted value NTcal or be higher than the predicted value NTcal in a case where the waste gate valve 21 is closed and in a closed state. In Step S106, the predicted value NTcal of the calculated rotation speed NT of the compressor impeller 13 is set as the reference value NTst and the reference value NTst is compared to the detected rotation speed NT of the compressor impeller 13. In this manner, it is checked whether or not the closing of the waste gate valve 21 is completed.

In a case where the rotation speed NT of the compressor impeller 13 is determined to be less than the reference value NTst in Step S106 (Step S106: NO), it is estimated that the closing of the waste gate valve 21 is not completed. Accordingly, the electronic control unit 30 drives the electric actuator 22 at a minimum operation amount θmin at which the driving in the valve-closing direction is allowed (Step S108). Then, the process proceeds to Step S104, and the processing of Step S104 to Step S106 is repeated. In other words, the driving of the electric actuator 22 in the valve-closing direction by the minimum operation amount θmin continues until the rotation speed NT of the compressor impeller 13 becomes equal to or higher than the reference value NTst.

In a case where the rotation speed NT of the compressor impeller 13 is determined to be equal to or higher than the reference value NTst in Step S106 (Step S106: YES), it is estimated that the closing of the waste gate valve 21 is completed. Accordingly, the electronic control unit 30 stops driving the electric actuator 22, and re-learns the operation position of the electric actuator 22 in this case as the closed position (Step S107). When the closed position is re-learned in this manner, this processing routine is completed and the valve-closing operation for the waste gate valve 21 is completed.

An effect that is achieved when the processing at waste gate valve closing is executed in the electric waste gate valve system 100 according to this embodiment will be described below. The abutting of the valve element 21a against the valve seat portion 21b is determined based on the current value AC flowing in the electric actuator 22 exceeding the reference current value AC close showing that the valve element 21a abuts against the valve seat portion 21b. After the valve element 21a abuts against the valve seat portion 21b, the electric actuator 22 is driven at the minimum operation amount θmin that allows the driving of the electric actuator 22. In other words, the waste gate valve 21 is driven, slowly and little by little, in the valve-closing direction after the valve element 21a abuts against the valve seat portion 21b and before the waste gate valve 21 is completely closed.

When the waste gate valve 21 is closed, the rotation speed NT of the compressor impeller 13 that is detected by the impeller rotation speed sensor 31 in Step S106 is compared to the reference value NTst that is set to a value which is equal to the predicted value NTcal of the rotation speed NT of the compressor impeller 13 at the closing. If the detected rotation speed NT of the compressor impeller 13 is determined to be equal to or higher than the reference value NTst in Step S106, the driving of the electric actuator 22 is stopped. In other words, the driving of the electric actuator is stopped based on the actual rotation speed NT of the compressor impeller 13 reaching the reference value NTst which is equal to the predicted value NTcal of the rotation speed NT of the compressor impeller 13 at a time when the waste gate valve 21 is closed.

In this embodiment, the operation position at a time when the driving of the electric actuator 22 is stopped in Step S107 is re-learned as the closed position of the valve element 21a. According to the embodiment described above, the following effects can be achieved.

In this embodiment, it is determined whether or not the waste gate valve 21 is completely closed based on the actual rotation speed NT of the compressor impeller 13. Accordingly, the timing at which the electric actuator 22 is stopped can be optimized. In addition, an excessively large load acting on the valve seat portion 21b during the valve-closing operation can be suppressed. Accordingly, sinking of the valve seat portion 21b can be suppressed.

In this embodiment, the waste gate valve 21 can be determined to be completely closed and the driving of the electric actuator 22 can be stopped, even if the operation position of the electric actuator 22 is not the operation position that is set as the closed position of the valve element 21a, when the detected rotation speed NT of the compressor impeller 13 is equal to or higher than the reference value NTst. If the detected rotation speed NT of the compressor impeller 13 does not reach the reference value NTst, it is determined that the waste gate valve 21 is not completely closed even if the operation position of the electric actuator 22 is the operation position that is set as the closed position. According to this embodiment, the driving of the electric actuator 22 continues until the detected rotation speed NT of the compressor impeller 13 becomes equal to or higher than the reference value NTst. In other words, any decrease in supercharging efficiency that is caused by stopping the driving of the electric actuator 22 in a state where the waste gate valve 21 is not completely closed can be suppressed.

In this embodiment, the driving continues at the minimum operation amount θmin, at which the electric actuator 22 can be driven in the valve-closing direction, until the waste gate valve 21 is completely closed after the valve element 21a abuts against the valve seat portion 21b. Accordingly, an excessively large load acting on the valve seat portion 21b can be suppressed, and sinking of the valve seat portion 21b can be further suppressed.

In this embodiment, the driving amount of the electric actuator 22 becomes the minimum operation amount θmin and the operation speed of the electric actuator 22 becomes lower than the operation speed prior to the abutting of the valve element 21a against the valve seat portion 21b after it is determined that the valve element 21a abuts against the valve seat portion 21b. Accordingly, the electric actuator 22 is quickly driven until the valve element 21a is seated on the valve seat portion 21b, and thus the length of time taken to close the valve element 21a can be shortened.

In this embodiment, the operation position at a time when the driving of the electric actuator 22 is stopped is re-learned as the closed position when the waste gate valve 21 is closed. Accordingly, driving control for the electric actuator 22 can be optimized in view of the closed position at the preceding closing in performing the valve-closing operation. In the embodiment described above, the driving speed of the electric actuator 22 is decreased when the operation position of the electric actuator 22 approaches the learned closed position, and thus control for decreasing the driving speed of the electric actuator 22 before the valve element 21a of the waste gate valve 21 abuts against the valve seat portion 21b can be performed.

The turbine impeller 14 and the turbine housing 12 are exposed to the high-temperature exhaust and thus are likely to be high in temperature. In this embodiment, the impeller rotation speed sensor 31 is disposed in not the turbine housing 12, which is likely to be high in temperature as described above, but the compressor housing 11. Accordingly, the rotation speed NT of the compressor impeller 13 can be measured with a thermal effect being reduced.

The embodiment described above can be appropriately modified as follows. In the embodiment described above, the predicted value NTcal of the rotation speed NT of the compressor impeller 13 that is calculated in Step S104 is set as the reference value NTst of the rotation speed NT of the compressor impeller 13 in Step S106. However, the calculated predicted value NTcal does not necessarily have to be set as the reference value NTst insofar as it can be determined that the waste gate valve 21 is completely closed. For example, a value that is slightly lower than the calculated predicted value NTcal may be set as the reference value NTst.

In the embodiment described above, the electric actuator 22 is driven at the minimum operation amount θmin, at which the driving in the valve-closing direction is allowed, until the waste gate valve 21 is closed after the valve element 21a abuts against the valve seat portion 21b. However, the load acting on the valve seat portion 21b can be suppressed if the driving speed of the electric actuator 22 is lower than prior to the abutting of the valve element 21a against the valve seat portion 21b, and thus the driving amount after the abutting does not necessarily have to be the minimum operation amount θmin. For example, the electric actuator 22 may be driven at an operation amount θ, which is larger than the minimum operation amount θmin, until the complete closing after the abutting of the valve element 21a against the valve seat portion 21b if the driving speed of the electric actuator 22 is lower than prior to the abutting.

The load acting on the valve seat portion 21b can be suppressed if the driving of the electric actuator 22 is stopped when the detected rotation speed NT of the compressor impeller 13 becomes equal to or higher than the reference value NTst. Accordingly, processing for decreasing the driving speed of the electric actuator 22 may be omitted.

In the embodiment described above, the rotation speed NT of the compressor impeller 13 is measured. The turbine impeller 14 and the compressor impeller 13, which are impellers of the turbocharger 10, are connected to each other by the shaft 15 and rotate with each other. Accordingly, a rotation speed of the turbine impeller 14 may be measured if an effect from exhaust heat is negligible.

The predicted value NTcal of the rotation speed NT of the compressor impeller 13 is calculated along with the measurement of the rotation speed NT of the compressor impeller 13. However, the invention is not limited to the embodiment. Since the turbine impeller 14 and the compressor impeller 13 are connected to each other by the shaft 15 and rotate with each other, a predicted value of a rotation speed of any one of the impellers may be calculated.

A method for calculating the predicted value NTcal is not limited to the method described in the embodiment described above. The calculation method can be appropriately changed insofar as the predicted value NTcal of the rotation speed NT of the compressor impeller 13 at the closing can be calculated.

For example, it takes time to calculate the predicted value NTcal of the rotation speed NT of the compressor impeller 13. Accordingly, a value that is higher to some extent may be calculated in order to provide a margin although the predicted value NTcal may be strictly calculated. According to this configuration, delay of the timing at which the electric actuator 22 is stopped can be suppressed even if a time lag is present between the timing at which the actual rotation speed NT of the compressor impeller 13 is measured and the timing at which the predicted value NTcal is calculated.

In the embodiment described above, the driving of the electric actuator 22 is stopped and the operation position in this case is re-learned as the closed position in Step S107. However, the re-learning does not necessarily have to be executed.

For example, the re-learning may be performed only when the learned closed position differs significantly from the operation position at a time when the electric actuator 22 is stopped or the learning processing itself may be omitted so that the re-learning is not performed at all.

What is claimed is:

1. A turbocharged internal combustion engine comprising:
a throttle valve positioned in an intake passage;
a fuel injection valve for injecting a fuel injection amount; and
an electric waste gate valve system comprising:
a waste gate valve configured to open and close a bypass passage that bypasses a turbine impeller of a turbocharger;
an electric actuator configured to drive the waste gate valve;
an impeller rotation speed sensor configured to measure a rotation speed of the turbine impeller of the turbocharger; and
an electronic control unit including executable instructions stored on non-transitory memory to:
determine a predicted value of the rotation speed of the turbine impeller when the waste gate valve is closed with respect to an engine operation state;
drive the electric actuator in a valve-closing direction to close the waste gate valve;
stop the waste gate valve being driven by the electric actuator when the rotation speed of the turbine impeller detected by the impeller rotation speed sensor increases to a reference value determined based on the predicted value;
detect a current value of a driving current of the electric actuator when the waste gate valve is closed; and
decrease an operation speed of the waste gate valve driven by the electric actuator when the current value exceeds a reference current value,
wherein the operation speed of the waste gate valve when the current value exceeds the reference current value is lower than the operation speed of the waste gate valve when the current value is equal to or lower than the reference current value, and
wherein the reference current value corresponds to the current value when a valve element of the waste gate valve abuts against a valve seat portion of the waste gate valve.

2. The turbocharged internal combustion engine according to claim 1,
wherein the electronic control unit further comprises the executable instructions to determine the predicted value based on an intake air amount, the fuel injection amount, an opening of the throttle valve, and an operation position of the electric actuator.

3. The turbocharged internal combustion engine according to claim 1,
wherein the electronic control unit further comprises the executable instructions to
learn the operation position of the electric actuator when driving of the electric actuator is stopped as a closed position of the waste gate valve, and
to decrease the operation speed of the waste gate valve driven by the electric actuator when the waste gate valve reaches the closed position, the operation speed when the waste gate valve reaches the closed position is lower than the operation speed when the waste gate valve does not reach the closed position.

4. The turbocharged internal combustion engine according to claim 1,
wherein the impeller rotation speed sensor is disposed in a compressor housing of the turbocharger and the impeller rotation speed sensor is to measure a rotation speed of a compressor impeller.

5. A method for controlling an electric waste gate valve system in a turbocharged internal combustion engine including a waste gate valve, an electric actuator, an impeller rotation speed sensor and an electronic control unit, the waste gate valve being configured to open and close a bypass passage that bypasses a turbine impeller of a turbocharger, the electric actuator driving the waste gate valve, the impeller rotation speed sensor measuring a rotation speed of the turbine impeller of the turbocharger, the method comprising:

determining, by the electronic control unit, a predicted value of the rotation speed of the turbine impeller when the waste gate valve is closed with respect to an engine operation state;

driving, by the electronic control unit, the electric actuator in a valve-closing direction to close the waste gate valve;

stopping, by the electronic control unit, a driving of the waste gate valve by the electric actuator when the rotation speed of the turbine impeller detected by the impeller rotation speed sensor increases to a reference value determined based on the predicted value;

detecting, by the electronic control unit, a current value of a driving current of the electric actuator when the waste gate valve is closed; and decreasing, by the electronic control unit, an operation speed of the waste gate valve driven by the electric actuator when the current value exceeds a reference current value, wherein the operation speed of the waste gate valve when the current value exceeds the reference current value is lower than the operation speed of the waste gate valve when the current value is equal to or lower than the reference current value, and wherein the reference current value corresponds to the current value when a valve element of the waste gate valve abuts against a valve seat portion of the waste gate valve.

* * * * *